United States Patent
Assadian

(10) Patent No.: US 7,912,757 B2
(45) Date of Patent: Mar. 22, 2011

(54) GIFT REGISTRY SYSTEM

(76) Inventor: Hamid Assadian, Newport Coast, CA (US)

(*) Notice: Subject to any disclaimer, the term of this patent is extended or adjusted under 35 U.S.C. 154(b) by 0 days.

(21) Appl. No.: 11/800,334

(22) Filed: May 4, 2007

(65) Prior Publication Data

US 2008/0275773 A1 Nov. 6, 2008

(51) Int. Cl.
*G06Q 30/00* (2006.01)
*G06F 17/30* (2006.01)
(52) U.S. Cl. .......................................... 705/26; 705/27
(58) Field of Classification Search ............... 705/26, 705/27
See application file for complete search history.

(56) References Cited

U.S. PATENT DOCUMENTS

| | | | |
|---|---|---|---|
| 6,609,106 B1 * | 8/2003 | Robertson | 705/26 |
| 6,669,088 B2 * | 12/2003 | Veeneman | 235/383 |
| 7,013,292 B1 * | 3/2006 | Hsu et al. | 705/37 |
| 7,039,601 B2 * | 5/2006 | Gary | 705/14 |
| 7,174,307 B2 * | 2/2007 | Sakai et al. | 705/26 |
| 7,603,292 B1 * | 10/2009 | Bragg et al. | 705/26 |
| 2008/0172304 A1 * | 7/2008 | Berkowitz | 705/26 |

OTHER PUBLICATIONS

"Wedding Bells: Show them the money" by Katherine Dedyna published in the Leader Post on Jun. 18, 2005. p. G.1.Fro.*

* cited by examiner

*Primary Examiner* — Bradley B Bayat
*Assistant Examiner* — Courtney Stopp

(57) ABSTRACT

A gift registry system facilitates the availability of a convenient online accessed gift registry in which a plurality of gift givers make money gifts directly to an accumulating gift registry. The gift registry is maintained by a gift registry operator for the benefit of a registry owner. The gift registry operator accumulates funds given and provides accounting and tabulation of gifts given by each gift giver. Additionally, the gift registry operator provides interactive online service to be accessed by givers and banking services sufficient to accumulate and transfer funds. Finally, a plurality of merchants, vendors and service providers interact with the gift registry operator to offer incentives to the gift registry owner to interact with the subscribing merchants, vendors and service providers in spending the accumulated gift funds.

7 Claims, 2 Drawing Sheets

US 7,912,757 B2

GIFT REGISTRY SYSTEM

FIELD OF THE INVENTION

The present invention relates generally to systems for gift giving in anticipation of traditional events such as weddings, bridal and baby showers, birthdays, graduations and the like and particularly to systems for facilitating the giving and receipt of individual gifts by large numbers of people to a common recipient or recipients.

BACKGROUND OF THE INVENTION

For many years, people invited to traditional gift giving occasions such as weddings, bridal showers, baby showers or the like, purchased a gift in anticipation of the event. While many people chose gifts which they hoped would be well received and appreciated and would be of great use and benefit to the recipient, others elected to simply give gifts of money in various forms such as cash or checks. To the recipients, gifts of money may well have been the most practical and convenient gift and the most appreciated. However, gift givers often desire to give an actual gift rather than money. For most, there was a desire on the part of gift givers to provide a gift which would be individually cherished or at least appreciated and used for many years. Many gift givers preferred the personal touch of a purchased item. For these gift givers simply giving money often seemed impersonal and lacking in warmth or sentiment.

As a result of these feelings on the part of gift givers, the custom of giving specific gift items rather than money has continued through the years. Unfortunately, this well-intention custom has, in most instances, resulted in extensive redundancy of gifts received by the recipients. In a typical wedding of substantial size for example, the bride and groom may be overwhelmed with double, triple or even more redundant gifts of common items such as appliances, decor items such as pictures or mirrors or aesthetic items such as pottery, statuary or flower vases. Similarly, kitchen items such as flatware, cooking utensils or dishes experience substantial duplication in most wedding situations. Other occasions such as bridal showers, baby showers and birthdays experience similar duplication of gifts due to the tendency of gift givers to generally think along common lines of thought in selecting a gift for the recipient.

The consequences of all this uniformed but well intentioned gift giving are often vexing and stressful for the gift recipients. The recipients are left with the task of choosing that which is to be kept and that which is to be returned. This task is often daunting and is made even more difficult due to the very real possibility of creating offense to those whose gifts are returned rather than kept. As a result, the problems associated with such gift giving situations has, for the most part, continued.

Through the years, retailers have provided a marvelous solution to this problem by creating a system known as "gift registration". The gift registration system was simple enough in that potential gift recipients (such as the bride and groom at a wedding) went to a prominent retailer and "pre-shopped" a wish list of desired gifts. The retailer then compiled a gift list under the recipient's names. Typically, the list comprised products to be purchased from the retailer directly and thus included the retailers purchase prices for the various items. This allowed gift givers to select a gift of a desired cost. In addition, the retailer "tracked" gift purchases and deleted gifts from the list or marked them as "purchased" as gift givers bought the various listed items. This tracking by the retailer and indication to the potential purchaser or gift giver avoided much of the redundancy of gift giving which had previously occurred.

The gift registry system proved to be a substantial benefit to all parties. The system made selection easier for gift givers and did indeed avoid most gift redundancies. In addition, the gift registry system virtually guaranteed substantial sales by the retailer providing the gift registration.

With the advent of the internet and the rise of so-called "online" purchasing, the gift registration system readily adapted to the new purchasing power of online purchasers. Under the revised gift registration system, the retailer continued to maintain the gift registration list and track gift purchases as previously provided. However instead of requiring a trip to the retailer's store, the list was now available on the retailer's website and could be readily accessed by persons going online. Additionally, purchases being carried forward as online purchases was substantial convenience to the gift purchasers. While the newer online gift registry systems have proven to be convenient, the many practical advantageous and conveniences of money gifting have yet to be provided.

In addition to gift registry, many retailers and other entities such as shopping malls or the like have for many years have provided systems of gift certificates. In these systems, gift givers simply purchase gift certificates in a selected cash amount. The resulting purchased gift certificates are given to the gift givers in a tangible form which is then given personally to the gift recipients at the particular occasion. The recipients use the gift certificates much like temporary credit cards or cash to purchase gifts from the issuing retailer or shopping mall. This system has many of the advantages of money gifting. However, such gift certificates must usually be redeemed, at least initially, at the issuer's facility. In addition, gift certificates are often not adequately protected against loss or theft. Thus, despite their advantages, gift certificates have been proven to be subject to several limitations.

In the face of the limitations and deficiencies of the above-described gifting systems, there remains nonetheless a continuing and unresolved need in the art for gifting systems which exploit the overwhelming convenience and practicality of money gifting while providing the joys of more personal touch gift giving and feelings of participation of item gifting to the gift givers in a secure and protected process.

SUMMARY OF THE INVENTION

Accordingly, it is a general object of the present invention to provide an improved gifting system. It is a more particular object of the present invention to provide an improved gift registry system for use in traditional gift giving events such as weddings, bridal showers, baby showers, birthdays and the like. It is a still more particular object of the present invention to provide an improved gift registry system for use in gifting which maintains a maximum degree of security and protection both for the gift giver and the gift recipient.

In accordance with the present invention, there is provided a method of providing a gift registry comprising the steps of: establishing a gift registry in the name of a gift registry owner; presenting the gift registry for online access by internet users; receiving cash gifts from some of the internet users in the name of the gift registry owner; accumulating the cash gifts for the gift registry owner; accounting to the gift registry owner for a total of gifts received; and providing a plurality of options to the gift registry owner for using or receiving the total of gifts received.

The invention also provides a method of providing a gift registry in which a gift recipient registers with a gift registry operator to establish a gift registry comprising the steps of: establishing a dedicated gift registry for the gift recipient; presenting the dedicated gift registry to a plurality of internet users; receiving gifts in cash amounts from a plurality of internet users and accumulating the gifts to the gift recipient's account; and transferring accumulated gifts to the gift recipient.

BRIEF DESCRIPTION OF THE DRAWINGS

The features of the present invention, which are believed to be novel, are set forth with particularity in the appended claims. The invention, together with further objects and advantages thereof, may best be understood by reference to the following description taken in conjunction with the accompanying drawings, in the several figures of which like reference numerals identify like elements and in which:

DESCRIPTION OF THE PREFERRED EMBODIMENTS OF THE INVENTION

Figure 1:
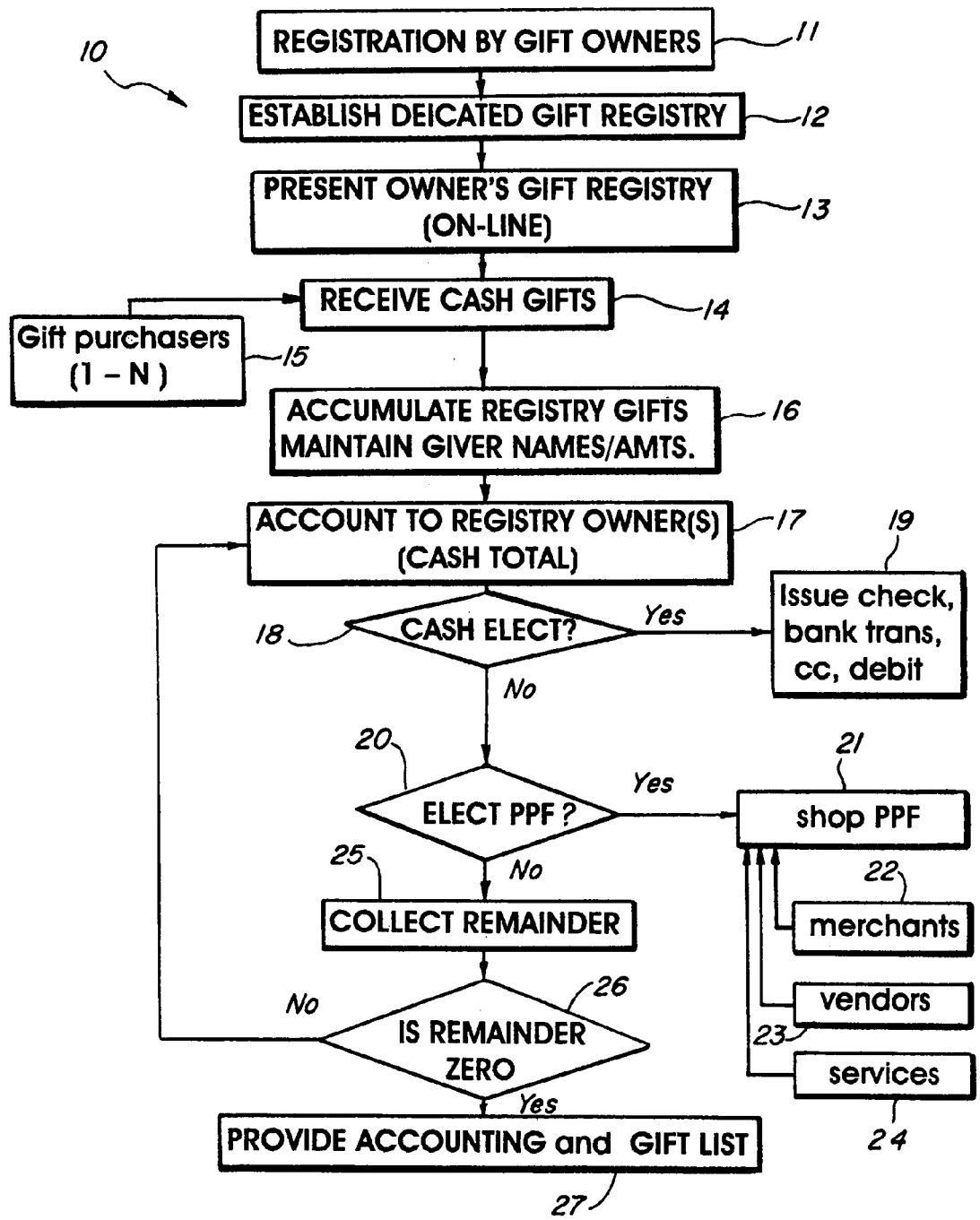
FIG. 1 sets forth a flow diagram for the present invention gift registry system.

FIG. 1 sets forth a flow diagram of the operation of the present invention gift registry system generally referenced by numeral 10. System 10 is characterized by an initial step 11 at which the potential gift recipients enter into the establishment of a gift registry with the gift registration operator. The gift registration operator may, for example, be a bank or credit card company or, alternatively, may be operated by an investment group or the like. The essential feature of the registration operator is the capability to establish and maintain the individual gift registry as well as relevant data required by the gift recipients and to have sufficient resources and online capability to provide cash flow and functionality for the present invention system. Once the initial registration has taken place at step 11, the operation moves to a step 12 in which the registry operator establishes a dedicated gift registry for the potential gift recipients. For purposes of convenience, the potential gift recipients having registered in the gift registry are sometimes referred to hereinafter as the "owners" of their particular dedicated individual gift registry. Following the establishment of a dedicated gift registry at step 12, the system moves to a step 13 in which the registry operators utilize their online capability to present the owners gift registry in a user accessible online presentation. While a variety of systems may be used, the anticipated form of this presentation involves the use of one or more online websites operated by the registry operator for the benefit of the registry owners. Thus, a single website which provides links to individual registries may be utilized by the registry operator to allow gift givers to access the desired gift registry and interact on an online basis.

At step 14, the registry operator accumulates and receives cash gifts which are provided at step 15 by a plurality of gift givers or purchasers. While the number of gift givers or gift purchasers is indefinite in any given situation, the essential function at step 14 is the accurate accumulation of all gift amounts given by gift purchasers or givers. In the anticipated operation of the present invention system, virtually any valid cash transfer apparatus will be available to gift purchasers and will be maintained by the registry operator with the essential function being the transfer of funds from the gift purchasers to the gift registry for accumulation at step 14. Thus, for example, the registry owner would be capable of receiving funds by direct cash payment such as checks or the like, direct bank wire transfers from the gift giver's account, cash transfers from credit cards held by gift givers as well as other forms of paypal or wire transfer or the like.

For a predetermined time interval in anticipation of the event, cash gifts flow into the registry at step 14 and are thereafter accumulated at step 16. The time interval for gift accumulation may be established in anticipation of a particular event such as a wedding day or the like. Alternatively, a time interval which extends beyond the event may be preferable in anticipation of late or after-the-fact givers. In any event, at step 16 the registry operator accumulates gifts to the particular registry owners and maintains an accurate list of giver names and amounts given for later use by gift recipient owners. Following the accumulation and creation of appropriate accounting statements and lists of givers and amounts given at step 16, the system then provides an accounting to the registry owners in the form of a cash total. Provision may be made for periodic interim accountings to be provided as desired or needed by the registry owners. However, at step 17, the anticipated accounting is a cash total which represents the entire amount given by gift purchasers at step 15.

Having the cash total accounting at step 17, the registry owners may then exercise one or more of several payout or cashout options which the registry operator makes available. In addition, the various alternatives described below may be exercised in partial amounts of the accumulated cash total with a mixing of different options being available to the registry owners.

Following the accounting at step 17, the system moves to a decision step 18 in which the registry owner elects to receive a cash payout or, alternatively, declines in favor of other options. If at step 18 the registry owner elects a cash payout, the system moves from step 18 to step 19 and the registry operator issues payment or money transferred in the form desired by the registry owner. As mentioned above, a variety of fund transfer mechanisms will be available to the gift registry owners. These issued funds may comprise a bank check, bank transfer, temporary credit card in a given amount, temporary debit card in a given amount, or a permanent credit card issued by the registration operator or a cooperating bank in which a positive balance is indicated. The advantage of the permanent credit card would include the establishment of credit standing and the assurance of credit availability once the positive amount has been used up.

In the event at step 18 the registry owner elects not to take a cash payout, the system moves to a decision step 20 at which the registry owner may elect to use a purchasing power factor provided by the registry operator in cooperation with subscribing vendors, merchants or service providers. This purchasing power factor results from commitments by cooperating merchants, vendors or service providers to, in essence, increase the purchasing power of gift registry owners choosing to transact business with the subscribing merchants, vendors or service providers. The purchasing power factor provided would, in most instances, result from an ongoing agreement between the various merchants, vendors and service providers and the registry operator. In essence, these merchants, vendors or service providers would be contracting to offer an increase in purchasing power to gift registry owners in return for a substantial amount of business opportunity. Thus, a particular merchant may elect to provide a purchasing power factor in which a hundred twenty dollar purchasing power is provided for each hundred dollars by the gift registry owner. Other purchasing factors may be applied, however, at different amounts in accordance with the business needs and incentive rewards considerations of the various merchants, vendors and service providers.

In accordance with an alternative form of purchasing power factor operation, the registry owner may elect to solicit bids of purchasing power factors from competing merchants. In this option, the registry owner possibly acting through the registry operator will place a predetermined purchase amount up for "auction". In response, competing vendors, etc. are then able to offer bids of purchasing power for the amount which the registry owner is offering in solicitation of bids. Competing vendors, etc. then bid the purchasing power factors which they are offering to the gift registry owner. The competitive bidding process is likely to create higher purchasing power factors to the benefit of the gift registry owner.

In the event the user elects at step 20 to exercise the purchasing power factor system, the gift registry owners then exercise their shopping decisions at step 21 and thereby select the various items and services to be purchases from cooperating merchants, vendors and service providers. At steps 22, 23 and 24 these merchants, vendors and service providers would interact with the shopping gift registry owner to complete the transactions in accordance with the purchasing power factors in play at the time.

In the event, the user elects at step 20 not to exercise the purchasing power factor system, the system moves to step 25 at which the remaining available funds are collected and reported. At step 26, a determination is made as to whether the gift registry owner's funds have been exhausted or whether a remainder exists. In the event the funds are exhausted, the system moves to step 27 to provide a complete accounting of funds collected, funds expended and a gift list containing each gift giver and the amount given thereby. If, however, a remainder exists at step 26, the system returns to step 17 providing an updated accounting to the gift registration owner. Thereafter, the user again goes through the selection process found in steps 18 through 24. This process continues as various portions of the gift owner's funds are spent or collected until the funds are found at step 26 to be exhausted and the system moves to step 27 for a final accounting.

It will be noted by examination of steps 17 through 25 that the gift registry owner is able in the present invention system to receive and spend funds in partial amounts. Thus, at step 18, for example, where the registry owners makes an election as to whether to take cash immediately, it will be recognized that the owner may elect to take a portion in cash having that portion then issued at step 19 while continuing to step 20 with the remaining funds and may therein elect whether to allocate a further portion of the remaining funds to the purchasing power factor system of step 21. In each determination, a collection of unspent funds is made at step 25 until a zero balance or complete exhaustion of the registry owner's funds it obtained. The provision of the final accounting at step 27 allows the gift registry owners to maintain accurate receipts and information as to funds taken and funds expended as well as to properly respond to gift givers using the convenient list of gift givers and amounts given.

Thus, the present invention gift registry system generally referenced by numeral 10 in FIG. 1 will be understood to provide substantial advantages over the previous systems. These advantages include ease of operation by gift givers together with a maximum of security and protection for the gift registry owners or gift recipients. Further, the financial advantages available in the combined purchasing power exercised by the gift registry operators in dealing with merchants, vendors and service providers is available to each gift registry owner. It will be apparent to those skilled in the art that the gift registry operator having huge funds available for potential purchases by gift registry owners is able to negotiate extremely beneficial purchasing power factors exercisable by the individual gift registry owners. This, in effect, greatly multiplies the value of a gift given in the present invention gift registry system.

Figure 2:
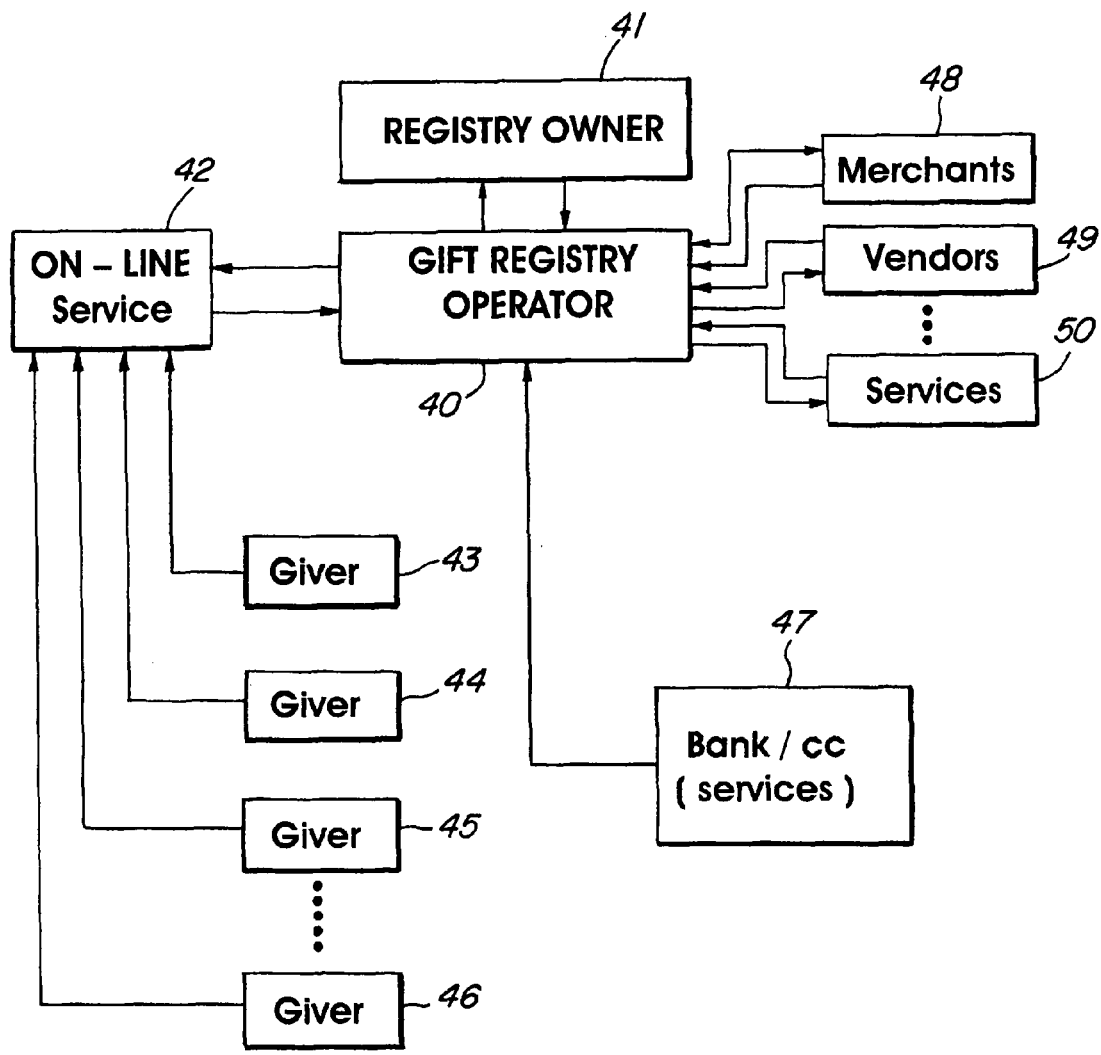
FIG. 2 sets forth a block diagram of the business relationships between the various parties operating within the present invention gift registry system.

FIG. 2 sets forth a block diagram depicting the interrelationships of the various parties operating within the present invention gift registry system. More specifically, a gift registry operator 40 functions in a very central role of the operation of the present invention gift registry system. While a variety of operator types may be utilized without departing from the spirit and scope of the present invention, it is anticipated that the gift registry operator would likely comprise a bank or other financial institution or credit card company able to move funds easily and able to maintain the various registries and accountings that are required under the present invention system. Alternatively, gift registry operator 40 may comprise a group of investors providing funds to an administrative operator. The essential function of gift registry operator 40 is to provide the centralized operation of a plurality of individual gift registry on behalf of registered gift registry owners in accordance with the above-described operation. A gift registry owner 41 interacts with registry operator 40 in providing sufficient information to operator 40 to enable operator 40 to carry forward the gift registration system. Conversely, sufficient communication is exercised between gift registry owner 41 and gift registry operator 40 to provide transfer of funds as well as accounting and reporting in the manner described above.

In the operation of the present invention system contemplated herein, gift registry operator 40 would interactively employ an online service provider 42. Service provider 42 interacts with gift registry operator 40 to set up and maintain individual gift registries for online presentation and operation by gift givers. Additionally, online service provider 42 interacts with gift registry operator 40 to maintain communication of gifts to registry operator 40 which facilitate the accounting and accumulation of funds carried forward by gift registry operator 40. A plurality of gift givers represented by givers 43, 44, 45 and 46 provide an undetermined number of persons who interact with the present invention gift registry system through online service provider 42. The interaction of gift givers 43 through 46 with online service provider 42 is a transfer mechanism by which the givers communicate with the individual gift registry by gift registry operator 40. Thus, online service provider 42 maintains a "pass-through" operation and functions virtually entirely as a communication apparatus for gift registry operator 40.

In the most likely configuration of the present invention system, gift registry operator 40 utilizes a source of bank and credit card services 47. Bank and credit card services provider 47 may in fact be a cooperating bank or credit card company. Alternatively, provider 47 may be an alternative form of banking services. The essential function of services provider 47 in service to gift registry operator 40 includes the availability of apparatus for transferring and storing the accumulated funds of a particular gift registry.

In order to facilitate the above-described purchasing power factor option of the present invention system, gift registry operator 40 interacts with a plurality of merchants 48 which typically include both merchants and their cooperating advertisers. The function of interaction between gift registry operator 40 and cooperating merchants and their advertisers 48 is carried forward primarily to maintain a working agreement in which merchants 48 agree to honor a predetermined purchasing power factor which is available to gift registry owners 41 operating through gift registry operator 40 to purchase goods from merchants 48. As mentioned above, the anticipated form of this purchasing power factor is found in a multiple or percentage increase of any given amount of purchase. The example given above will be recalled that merchants 48 may, for example, agree to allow purchasers operating through gift registry operator 40 to purchase a hundred twenty dollars worth of merchandise for each hundred dollars spent with merchants 48. It will be apparent to those skilled in the art that other purchasing power factors may be utilized and that the above factor is merely an illustration. Similarly, a plurality of vendors 49 also anticipated to have cooperating advertisers interacts with gift registry operator 40 to also provide a purchasing power factor for registry owner 41 in utilizing vendors 48. Finally, a plurality of service providers 50 also anticipated to have cooperating advertisers interacts with gift registry operator 40 to provide a predetermined purchasing power factor for registry owner 41 applicable to all services provided by service provider 50 through gift registry operator 40.

By way of summary, the present invention gift registry system will be recognized as a convenient and extremely practical alternative to the prior art gift registry systems both in retail stores and online internet services exercised in the past. The present invention gift registry system allows individuals to sign up to collect accumulated cash which gift givers may give in any selected amount. At the completion of gift collection the gift registry owner may elect to either receive a cash credit for all gifts given or elect to use the accumulated cash credit as part of a major purchasing power from cooperating merchants, vendors and service providers. One of the important aspects of this option exercised by gift registry owners is found in a purchasing power factor in which cooperating merchants, vendors and service providers agree to honor all purchase amounts increased by a predetermined factor.

Merchants, vendors and service providers cooperating with gift registry operators are able to utilize advertising of their various goods and services on the gift registry website to further enhance the value to merchants, vendors and service providers of entering into agreements with the gift registry operator. The gift registry owner may choose to set forth established gift level such as ten dollars, twenty-five dollars, one hundred dollars, one thousand dollars and so on or, alternatively, may invite givers to choose their own gift amount. Credit card, bank transaction, paypal or other services are accepted by the gift registry operator. The gift registry operator functions to provide transactions which accumulate the various types of accepted gifts into a single cash entity which is available to the registry owner. The interactions of functioning entities within the present invention gift registry system may be established by the participants in accordance with their business needs and their business leverages. Thus, for example, credit card fees and other aspects of the business model operating between the participants may be set in the same manner as set by other interacting businesses utilizing such services. The participants may elect to maintain certain fees for direct cash disbursements to offset the credit card fees and other bank fees charged to the participants in the event the gift registry owner elects a simple cashout option. Obviously, the provision of such a fee attached to such direct cashout options provides an incentive to the gift registry owner to exercise other available options. It will be apparent that such fees may be waived by any or all of the participants as part of an inducement to guide the gift registry owner toward certain transactions.

What has been shown is a novel gift registry system which provides a secure and easily operated gift registry system having ease of operation by gift givers and very practical protections and advantages to the registry owner. The system further provides a convenient operative mechanism by which various merchants, vendors and service providers may choose to enter into agreements with the gift registry owners which supply inducements to the gift registry owner to transact business with the various merchants, vendors and service providers. The present invention gift registry system maintains the ease of online operation and interaction together with the security and protection of sophisticated banking systems and credit card systems.

While particular embodiments of the invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention.

That which is claimed is:

1. A method of providing a gift registry in which a gift registry owner registers with a gift registry operator to establish a gift registry comprising the steps of:
    establishing by said gift registry operator a dedicated gift registry for said gift registry owner upon an on-line website using one or more computers and internet access;
    presenting by said gift registry operator said dedicated gift registry to a plurality of internet users using the internet;
    soliciting by said gift registry operator competing purchasing power factor bids from cooperating merchants, vendors and service providers;
    establishing for said gift registry owner a purchasing power factor for each of said cooperating merchants, vendors and service providers wherein each of said merchants, vendors and service providers commits to an increased effective purchasing amount honored by said merchants, vendors and service providers expressed as a multiplying factor for money used for purchases by said gift registry owner from said each of said merchants, vendors and service providers;
    receiving gifts in cash amounts from a plurality of internet users and accumulating said gifts to said gifts registry owner's account;
    following said establishing of said purchasing power factor, selecting by said gift registry owner the portion, if any, of said gifts to be allocated to said merchants, vendors and service providers;
    providing by said gift registry operator a purchase option for said gift registry owner to take some or all of said total of gifts received as purchases of goods or services using some or all of the total cash gifts and the established purchasing power factor
    transferring accumulated gifts to said gift registry owner.

2. The method of providing a gift registry set forth in claim 1 wherein said step of receiving includes the step of receiving credit card payments from said internet users.

3. The method of providing a gift registry set forth in claim 2 wherein said step of receiving includes the step of receiving bank transfers from said internet users.

4. The method of providing a gift registry set forth in claim 2 wherein said step of receiving includes the step of receiving cash payments from said internet users.

5. The method of providing a gift registry set forth in claim 2 wherein said step of receiving includes the step of receiving paypal transfers from said internet users.

6. A method of providing by a gift registry operator a gift registry comprising the steps of:
- establishing by said gift registry operator a gift registry in the name of a gift registry owner upon an on-line website using one or more computers and internet access;
- presenting by said gift registry operator said gift registry for online access by internet users using the internet;
- receiving by said gift registry operator cash gifts from some of said internet users in the name of said gift registry owner;
- accumulating by said gift registry operator said cash gifts for said gift registry owner and maintaining a list of gift givers and amounts given by each;
- establishing by said gift registry operator a purchasing power factor for each of said cooperating merchants, vendors and service providers wherein each of said merchants, vendors and service providers commits to multiplying money used by said gift registry owner by a factor for purchases made by said gift registry owner from said merchants, vendors or service providers
- following said establishing, providing by said gift registry operator a plurality of options to said gift registry owner for using the established purchasing power factor and receiving said total of gifts received, said step of providing by said gift registry operator a plurality of options including the steps of:
- providing by said gift registry operator a payout option for said gift registry owner to take some or all of said total of gifts received as direct payout; and
- providing by said gift registry operator a purchase option for said gift registry owner to take some or all of said total of gifts received as purchases of goods or services using some or all of the total cash gifts and the established purchasing power factor.

7. A method of providing by a gift registry operator a gift registry comprising the steps of:
- establishing by said gift registry operator a gift registry in the name of a gift registry owner upon an on-line website using one or more computers and internet access;
- presenting by said gift registry operator said gift registry for online access by internet users;
- receiving by said gift registry operator cash gifts from some of said internet users in the name of said gift registry owner;
- accumulating by said gift registry operator said cash gifts for said gift registry owner;
- accounting by said gift registry operator to said gift registry owner for a total of gifts received expressed as a money amount;
- establishing by said gift registry operator a purchasing power factor for each of said cooperating merchants, vendors and service providers wherein each of said merchants, vendors and service providers commits to multiplying money used by said gift registry owner by a factor for purchases made by said gift registry owner from said merchants, vendors or service providers;
- following said establishing providing by said gift registry operator a plurality of options to said gift registry owner for using the established purchasing power factor and receiving said total of gifts received and providing by said gift registry operator a payout option for said gift registry owner to take some or all of said total of gifts received as direct payout; and providing by said gift registry operator a purchase option for said gift registry owner to take some or all of said money amount of said total of gifts received and the established purchasing power factor to be used by said gift registry owner for purchases of goods or services from cooperating merchants, vendors and service providers.

* * * * *